INVENTOR
YUZURU INOUE
BY Louis Bernat
ATTORNEY

INVENTOR
YUZURU INOUE

BY Louis Bauer

ATTORNEY

United States Patent Office 3,499,984
Patented Mar. 10, 1970

3,499,984

TIMING ERROR DETECTING SYSTEM

Yuzuru Inoue, Tokyo, Japan, assignor to Victor Company of Japan, Limited, Yokohama, Japan, a corporation of Japan Filed Aug. 15, 1966, Ser. No. 572,576
Claims priority, application Japan, Aug. 17, 1965, 40/50,047
Int. Cl. H04n 5/21
U.S. Cl. 178—69.5 11 Claims

ABSTRACT OF THE DISCLOSURE

The invention provides for detecting timing errors, in a video tape recorder. These errors are of a type caused by changed operating conditions or tape tension, or by stretched or shrunken tape, or the like. The error detector provides a first error signal responsive to the video or horizontal signals and a second error signal responsive to the vertical synchronizing signals. The first and second signals are combined to correct the error. A clamping circuit limits the time interval during which the second or vertical synchronizing signals can take effect.

Figure 1:
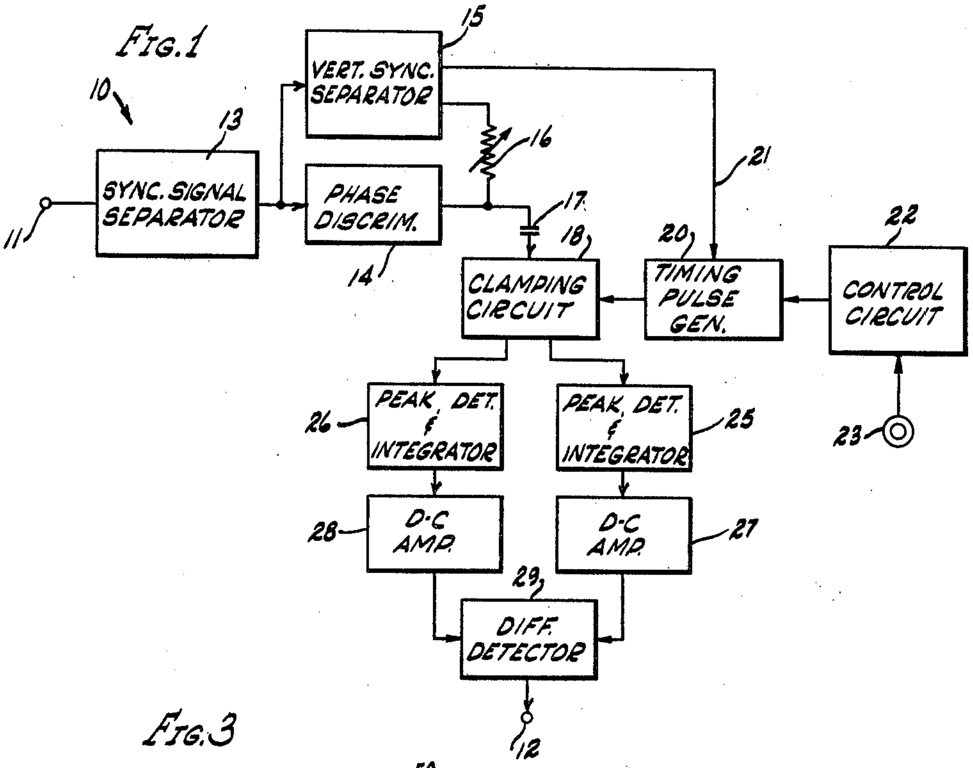

This invention relates to a timing error detecting system and more particularly to a timing error detection system designed for use in controlling rotation of a multiple head scanning unit of a video reproducing apparatus. The system of this invention produces a timing error signal with a high degree of accuracy and reliability and insures against distortions such as "venetian blind" and jitter effects.

The system of this invention is particularly designed for a multiple head helical scan recording and reproducing apparatus in which heads in equi-angularly spaced relation on a rotating head unit sequentially trace diagonal tracks across a magnetic tape, switching being effected from one head to another as one head reaches the end of a track and as another head engages the beginning of an adjacent track. In such systems, the condition of the magnetic tape may change between the recording and reproducing operations due to changes in operating conditions, changes in the tension on the tape, and elongation or shriking of the tape. As a result, timing errors occur which are particularly troublesome during the time intervals when the switching is effected from one head to another. The end result of such timing errors is the production of distortions such as a "venetian blind" effect wherein pronounced bands are produced on the screen of the reproducing picture tube and a jitter effect in which the position of the picture is shifted.

In an attempt to reduce timing errors, a system has heretofore been proposed wherein a phase discriminator is provided to develop an error signal having a magnitude and polarity corresponding to the amount and direction of changes in phase of horizontal synchronizing pulse components of the video signal. In such systems, an improvement in operation is obtained particularly in the time intervals between the time intervals of switching of the magnetic heads. However, such systems produce wow and flutter components and the operation is not always satisfatcory, particularly during the time intervals of switching of the magnetic heads.

This invention was evolved with the general object of providing a system for detecting timing errors with a high degree of accuracy and reliability, to overcome the disadvantages of prior art systems.

According to this invention, a timing error detecting system is provided including phase discriminator means for responding to a video signal to develop an error signal having a magnitude and polarity corresponding to the amount and direction of timing error phase changes of synchronizing pulse components of a video sigal, and compensation means are provided for eliminating the effect upon the error signal of portions of the video signal other than the timing error phase changes of the synchronizing pulse components of the video signal. This feature is highly advantageous in that it is found that the video signal contains components which adversely affect operation of the phase discriminator means and by eliminating the effect of such components, the error signal accurately reflects the timing error phase changes. Consequently, a much more precise control is obtained, and a better and more stable picture is produced.

A specific feature of the invention is based in part upon the discovery that the vertical synchronizing pulses, and also the equalizing pulses, included in the vertical synchronizing blanking interval, provide components which adversely affect the operation of the phase discriminator means. In particular, such pulses when applied to the phase discriminator means produce an error signal having an additive timing error. In accordance with this invention, a signal is applied in phase opposition to the error signal to compensate for the effect of the vertical synchronizing and equalizing pulses. Preferably, the compensating signal is developed by means of a vertical synchronizing pulse separating circuit.

Further important features of the invention are based upon the discovery that low frequency components of the video signal produce adverse effects on the error signal and that the timing error phase changes of principal concern are those produced during the time intervals in which the switching is effected from one head to another. In accordance with this invention, clamping means are provided for fixing the level of the error signal except during the time intervals in which the synchronizing pulse components are subject to the timing error phase changes, the clamping means being preferably operated except during time intervals corresponding to the head switchin time intervals. Further, the invention provides capacitance coupling means between the phase discriminator means and the clamping means to eliminate low frequency components from the error signal, the clamping means being effective to provide the proper D.C. level.

Additional features of the invention relate to the application of timing pulses to the clamping means, and to the circuitry of the clamping means.

This invention contemplates other objects, features and advantages which will become more fully apparent from the following detailed description taken in conjunction with the accompanying drawings which illustrate a preferred embodiment and in which:

FIGURE 1 is a block diagram showing a timing error detecting system constructed according to the principles of this invention.

Figure 3:
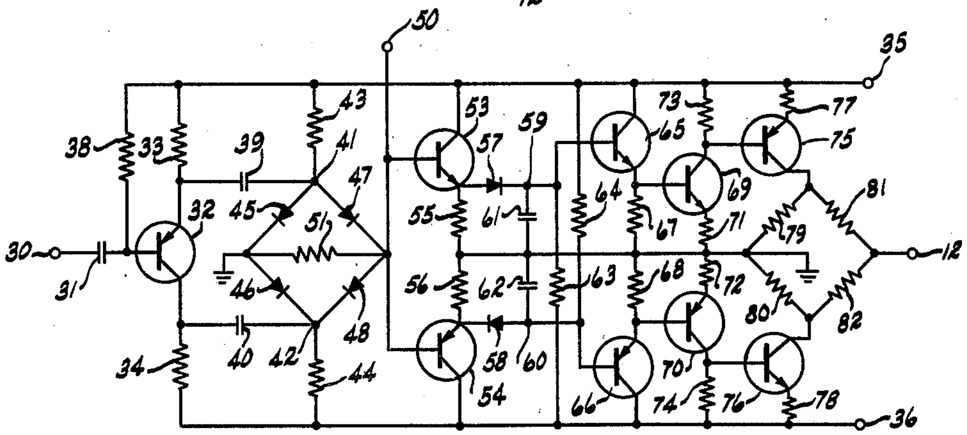
Figure 2:
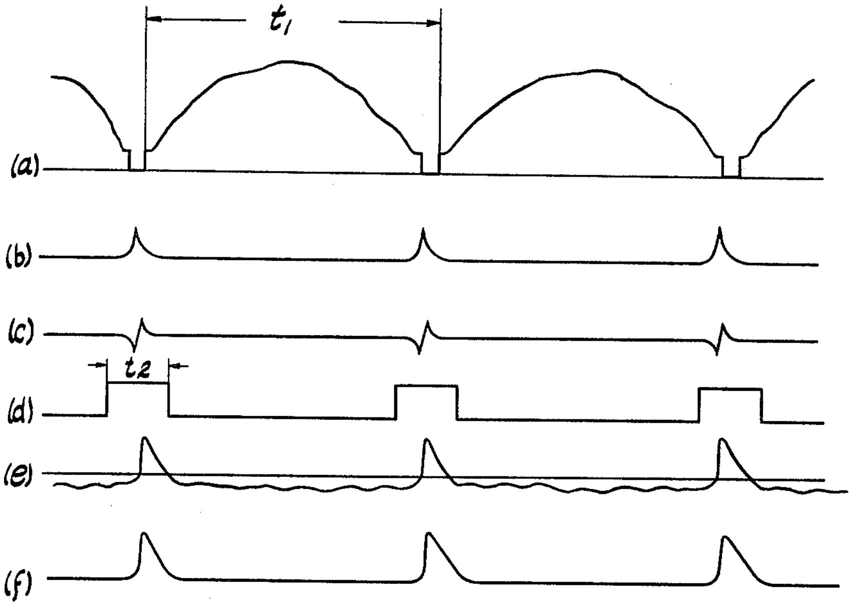

FIGURES 2(*a*) through 2(*f*) are views showing signal waveforms for explaining the operation of the system of FIGURE 1; and FIGURE 3 is a circuit diagram of a clamping circuit of the system of FIGURE 1.

Reference numeral 10 generally designates a timing error detecting system constructed according to the principles of this invention. In the system 10, a video signal such as produced by a multiple head helical scan videotape recording and reproducing system is applied to an input terminal 11 and a final output signal is developed at a terminal 12 usable for controlling the rotation of the multiple head scanning means, to obtain accurate tracking.

The input video signal at terminal 11 is applied to a synchronizing signal separator circuit 13, the output of which is applied to a phase discriminator 14 and also to a vertical synchronizing signal separating circuit 15. The phase discriminator circuit 14 is of a type known in the art, which compares the phase of the horizontal synchronizing pulses with the mean or average phase thereof, to develop an error signal having a magnitude and polarity corresponding to the amount and direction of the changes in the phase of the horizontal synchronizing pulses. The output of the phase discriminator circuit 14 could be used directly for the purpose of controlling the rotation of the multiple head unit to obtain the proper tracking. It is found, however, that the video signal contains components which adversely affect the operation of the phase discriminator means 14. In particular, the vertical synchronizing pulses, and also the equalizing pulses, applied during the vertical blanking time interval, produce the same effect on the phase discriminator 14 as a phase lead in the synchronizing pulse components.

In accordance with this invention, an output from the vertical synchronizing pulse separator circuit 15 is applied through a resistor 16 to the output of the phase discriminator 14, the resistor 16 preferably being adjustable to obtain optimum operation. The polarity of the vertical synchronizing pulse applied from the circuit 15 is opposite the polarity of the output signal from the phase discriminator 14, produced in response to the synchronizing and equalizing pulse components. As a result, a cancellation effect is obtained and the synchronizing and equalizing pulse components have no net effect on the output of the phase discriminator 14.

This feature is illustrated in FIGURES 2(*a*), 2(*b*) and 2(*c*). FIGURE 2(*a*) shows the video signal which does not include any timing errors, the time interval $t_1$ being the reciprocal of the vertical repetition rate. With a signal as shown in FIGURE 2(*a*) applied to the phase discriminator circuit 14, an output signal is produced as shown in FIGURE 2(*b*) which has an additive timing error. FIGURE 2(*c*) shows the signal produced by combining the signal of FIGURE 2(*b*) with an output signal from the vertical synchronizing pulse separator circuit 15. It will be observed that the positive-going and negative-going portions of the signal shown in FIGURE 2(*c*) are substantially equal and when the signal is applied through an integrating circuit, as hereinafter described, no net effect is produced.

Additional features of the invention relate to the coupling of the output from the phase discriminator 14 through a capacitor 17 to a clamping circuit 18. The capictor 17 operates to remove low frequency components, to thereby remove components which would adversely effect the final output signal. The clamping circuit 18 permits restoration of the DC level, to thereby permit use of the capacitor 17 in removing low frequency components. The clamping circuit 18 performs an additional very important function in fixing the level of the error signal except during predetermined time intervals in which the synchronizing pulse components are subject to the timing error phase changes. In particular, the clamping circuit 18 is operative to fix the level of the error signal except during head switching time intervals.

To control the clamping circuit 18, a clamp timing pulse pulse is applied thereto from a timing pulse generator 20. The timing pulse generator 20 can be controlled from an output of the vertical synchronizing pulse separator circuit 15, through a line 21, to be controlled during the vertical blanking interval of the reproduced signal, which corresponds to the head switching time interval. The timing pulse generator 20 can also be controlled from a control circuit 22 having an input connected to a device 23, operated from the rotation of the magnetic head unit, to apply a signal during the head switching time interval.

The operation of the clamping circuit 18 is such that it transmits a timing error signal of positive or negative polarity only when the clamp timing pulse is applied thereto from the timing pulse generator 20, during the head switching time interval. At other times, the clamping circuit operates to clamp the output signal thereof to a fixed level which is preferably at zero volts relative to ground.

The operation is illustrated graphically in FIGURE 2 wherein FIGURE 2(*d*) illustrates the form of the output of the timing pulse generator 20, which includes positive clamping pulses during the magnetic head switching time intervals. The duration of the time intervals is indicated at $t_2$, which may preferably be 600 microseconds in a conventional system in which the vertical repetition rate is 60 cycles per second. FIGURE 2(*e*) illustrates the type of waveform which may be produced at the input of the clamping circuit 18 when a timing error exists during the head switching time interval. It will be noted that the signal is subject to fluctuations during the time intervals between the head switching time intervals. Such fluctuations are removed by operation of the clamping circuit 18, so that the output of the clamping circuit 18 has a waveform as shown in FIGURE 2(*f*).

The output of the circuit 18 is applied to a pair of peak level detectors 25 and 26, respectively operative in response to positive and negative signals, which may also include integrator circuits, the outputs of the integrator circuits being applied through direct coupled amplifiers 27 and 28 to a differential detector circuit 29, which develops an output signal applied to the terminal 12.

FIGURE 3 is a circuit diagram of the clamping circuit 18 and also of the peak detector and integrator circuits 25 and 26, the direct coupled amplifier circuits 27 and 28 and the differential detector circuit 29. Referring thereto, the output of the timing pulse generator 20 is applied to a terminal 30 which is connected through a capacitor 31 to the base of a transistor 32 having emitter and collector electrodes connected through resistors 33 and 34 to power supply terminals 35 and 36, the base of transistor 32 being connected through a resistor 38 to the power supply terminal 35. The transistor 32 operates as a phase splitter, the emitter and collector electrodes thereof being respectively connected through capacitors 39 and 40 to circuit points 41 and 42 which are connected through resistors 43 and 44 to the power supply terminals 35 and 36.

To provide the clamping action, four diodes 45, 46, 47 and 48 are provided, diode 45 being connected between circuit point 41 and ground, diode 47 being connected between circuit point 41 and a terminal 50 which is connected through the capacitor 17 to the output of the phase discriminator 14, diode 46 being connected between ground and the circuit point 42, and diode 48 being connected between terminal 50 and the circuit point 42. A resistor 51 is preferably connected between terminal 50 and ground.

In operation, when the transistor 32 is non-conductive, all four diodes 45–48 are conductive and the potential of the terminal 50 is clamped to a potential substantially equal to ground potential, capacitors 39 and 40 being charged through current flow through the diodes and through the resistors 33 and 34. When the transistor 32 is rendered conductive by a timing pulse, the potentials of the emitter and collector electrodes of transistor 32 respectively move in negative and positive directions and through the capacitors 39 and 40, potentials are applied to the circuit points 41 and 42 to render the diodes 45–48 non-conductive. The clamping action no longer takes place, and the potential of the terminal 50 may then follow the output of the phase discriminator 14.

Terminal 50 is connected to the base electrodes of a pair of transistors 53 and 54 having collectors connected to the power supply terminals 35 and 36 and having emitters connected through resistors 55 and 56 to ground and also through diodes 57 and 58 to circuit points 59 and 60 which are connected through capacitors 61 and 62 to ground. The diodes 57 and 58 operate as peak detectors in response to positive and negative input signals, respectively, while capacitors 61 and 62 operate as integrating circuits, to hold the voltages developed by the peak detector diodes 57 and 58.

Circuit points 59 and 60 are respectively connected through resistors 63 and 64 to power supply terminals 36 and 35 and are also connected to the base electrodes of a pair of transistors 65 and 66 having collectors connected to the power supply terminals 35 and 36 and having emitter electrodes connected through resistors 67 and 68 to ground and also to the base electrodes of a pair of transistors 69 and 70. The emitters of transistors 69 and 70 are connected through resistors 71 and 72 to ground, while the collectors thereof are connected through resistors 73 and 74 to the power supply terminals 35 and 36 and also to the base electrodes of transistors 75 and 76. The emitters of the transistors 75 and 76 are connected through resistors 77 and 78 to the power supply terminals 35 and 36, while the collectors are connected through resistors 79 and 80 to ground and through resistors 81 and 82 to the output terminal 12.

With this circuit arrangement, the transistors 65, 66, 69, 70, 75 and 76 operate as balanced direct coupled amplifiers and the resistors 79–82, together with the transistors 75 and 76 operate as a differential detector to develop an output signal at the terminal 12 corresponding to the difference between the average levels of the signals developed by the peak detector diodes 57 and 58 and holding capacitors 61 and 62.

With this arrangement, an output signals is developed which accurately corresponds to the error developed in the switching time intervals, due to expansion and contraction of the magnetic tape, and distortions of the reproduced picture, such as "venetian blind" and jitter effects can be substantially obviated by proper application of the error signal. The error signal developed at terminal 12 can be applied to control the tension of the magnetic tape, or can be applied to the tape driving and/or head rotating mechanism, in order to obtain the proper synchronism to permit accurate tracking.

It will be understood that modifications and variations may be effected without departing from the spirit and scope of the novel concepts of this invention.

I claim as my invention:

1. In a timing error detecting system, means for supplying a video signal including first and second synchronizing pulse components subject to timing error phase changes, phase discriminator means for responding to said first synchronizing pulse components for developing a first error signal including an effect exerted by said second synchronizing pulse components, and compensation means for eliminating the effect included in said first error signal and for producing a second error signal having a magnitude and polarity corresponding to the amount and direction of said timing error phase changes.

2. In a timing error editing system as defined in claim 1, wherein said first and second synchronizing pulse components are horizontal and vertical synchronizing components respectively, wherein said horizontal synchronizing pulse components are subject to said timing error phase changes and wherein said vertical synchronizing pulse components are producing substantially the same effect on said first error signal as a phase lead in said horizontal synchronizing pulse components, said compensation means including a vertical synchronizing pulse separator circuit, and means for applying an output signal from said vertical synchronizing pulse separator circuit in phase opposition to said first error signal to generate an intermediate error signal.

3. In a timing error detecting system as defined in claim 2, said compensation means including clamping means for fixing the level of said intermediate error signal except during predetermined time intervals in which said synchronizing pulse components are subject to said timing error phase changes.

4. In a timing error detecting system as defined in claim 3, said video signal being of a type reproduced by a multiple head video tape reproducer, wherein said timing error phase changes occur during head switching time intervals, and means for timing said predetermined time intervals to correspond to said head switching time intervals.

5. In a timing error detecting system as defined in claim 4, timing pulse generating means arranged to apply timing pulses to said clamping means.

6. In a timing error detecting system as defined in claim 5, a vertical pulse separating circuit for applying control pulses to said timing pulse generator.

7. In a timing error detecting system as defined in claim 5, means for applying a rotatable head synchronizing pulse to said timing pulse generator.

8. In a timing error detecting system as defined in claim 3, capacitance coupling means between said phase discriminator means and said clamping means for eliminating low frequency components of said intermediate error signal.

9. In a timing error detecting system as defined in claim 3, signal transmission means including a peak detector responsive to said clamped intermediate error signal from said clamping means.

10. In a timing error detecting system as defined in claim 9, said signal transmission means further including an integrating circuit responsive to the output of said peak detector.

11. In a timing error detecting system as defined in claim 10, said signal transmission means further including a differential detector circuit responsive to the output of said integrating circuit to produce said second error signal.

References Cited

UNITED STATES PATENTS

| | | |
|---|---|---|
| 3,202,769 | 8/1965 | Coleman. |
| 3,235,662 | 2/1966 | Bopp. |
| 3,409,736 | 11/1968 | Hurst et al. |

ROBERT L. GRIFFIN, Primary Examiner

ALFRED H. EDDLEMAN, Assistant Examiner

U.S. Cl. X.R.

178—6.6